United States Patent [19]
Woo et al.

[11] 4,035,078
[45] July 12, 1977

[54] METHOD AND APPARATUS FOR INCREASING CONTRAST AND RESOLUTION FROM LOW DENSITY FILM

[76] Inventors: Harry W. Woo, 8104 Whittier Blvd., Bethesda, Md. 20034; Paul Reichel, 3000 Valentine Ave., Bronx, N.Y. 10458

[21] Appl. No.: 629,165

[22] Filed: Nov. 5, 1975

[51] Int. Cl.² .................. G03B 27/32; G03B 27/16
[52] U.S. Cl. .................................... 355/77; 355/119
[58] Field of Search ............... 355/71, 77, 113, 67, 355/70, 44, 18, 69, 119, 37, 115, 68; 40/63 A, 64 A, 106.1

[56] References Cited
U.S. PATENT DOCUMENTS

| | | | |
|---|---|---|---|
| 1,635,741 | 7/1927 | Carpio | 355/70 |
| 1,687,069 | 10/1928 | Iser | 355/71 |
| 1,820,494 | 8/1931 | Rennick | 355/70 |
| 2,206,396 | 7/1940 | Glass et al. | 355/70 X |
| 2,530,843 | 11/1950 | Smith | 355/70 |
| 2,596,376 | 5/1952 | De Goeij | 355/70 X |
| 2,674,933 | 4/1954 | Wigglesworth | 355/113 |
| 2,805,599 | 9/1957 | Pajes | 355/71 |
| 2,998,763 | 9/1961 | Brown | 355/113 X |
| 3,308,716 | 3/1967 | Caporael | 355/69 X |
| 3,312,143 | 4/1967 | Karow et al. | 355/71 X |
| 3,592,543 | 7/1971 | Bicki et al. | 355/70 X |
| 3,620,621 | 11/1971 | Rachwal et al. | 355/70 X |
| 3,702,733 | 11/1972 | Sokolow | 355/77 |
| 3,737,226 | 6/1973 | Shank | 355/67 |
| 3,797,932 | 3/1974 | Endter et al. | 355/18 |

FOREIGN PATENT DOCUMENTS

| | | | |
|---|---|---|---|
| 121,676 | 3/1931 | Austria | 355/70 |
| 883,396 | 3/1943 | France | 355/119 |
| 482,080 | 9/1929 | Germany | 355/71 |

Primary Examiner—Donald A. Griffin
Attorney, Agent, or Firm—Sughrue, Rothwell, Mion, Zinn and Macpeak

[57] ABSTRACT

Photograph film negatives with specular densities so low that they are not usable with transmitted light, e.g., densities below 0.3, may be used with substantially increased contrast and resolution when illuminated with a beam of light which is scattered by the developed silver grains of the film and viewed against a light absorbing background. Apparatus for practicing this method includes a light table for film readout convertible for conventional film readout; and copy camera-enlargers.

10 Claims, 4 Drawing Figures

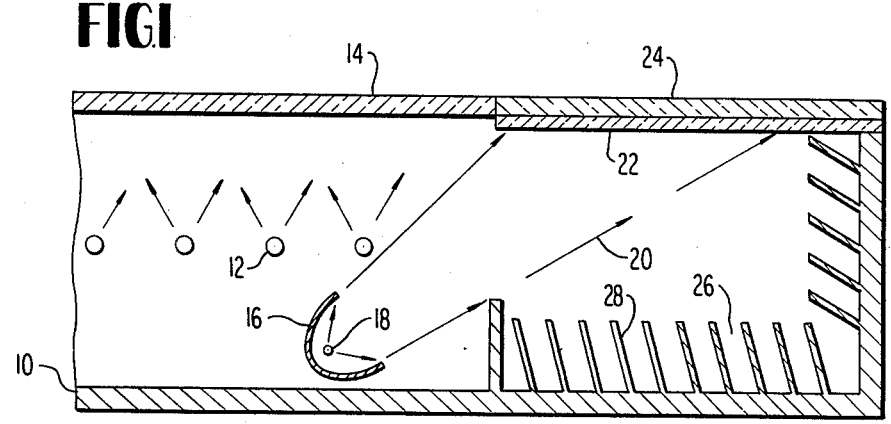
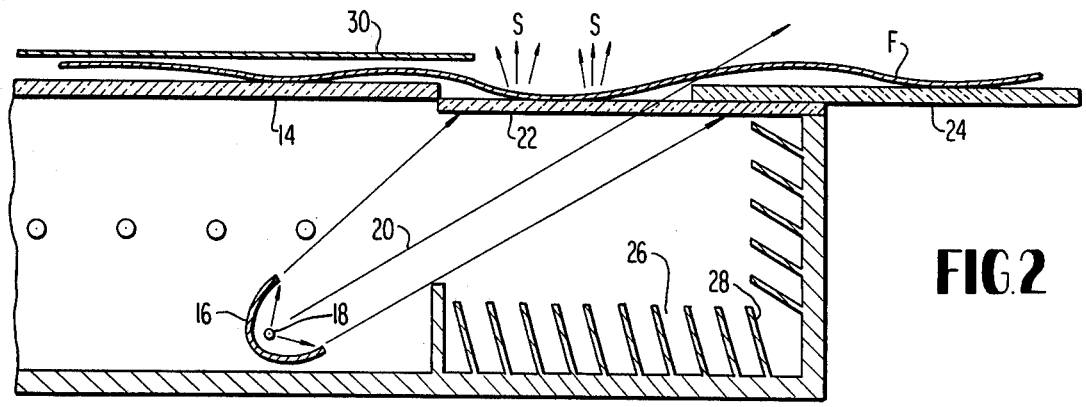
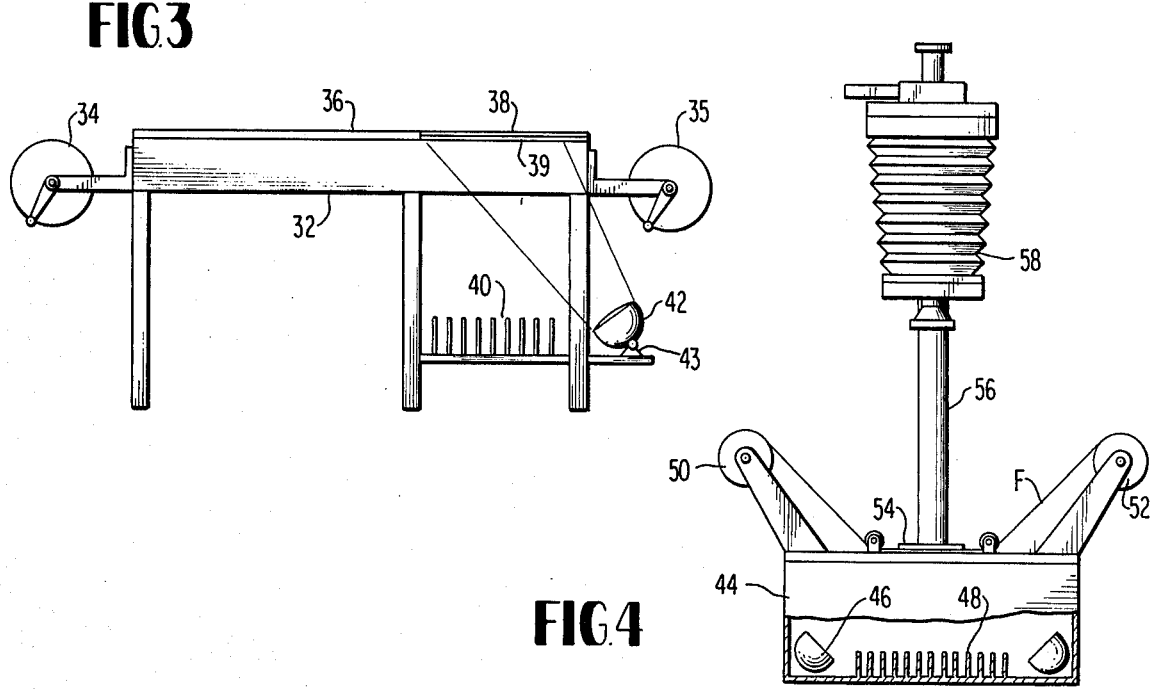

METHOD AND APPARATUS FOR INCREASING CONTRAST AND RESOLUTION FROM LOW DENSITY FILM

The invention described herein may be manufactured and used by or for the Government of the United States of America for governmental purposes without the payment to us of any royalty thereon.

BACKGROUND OF THE INVENTION

1. Field of the Invention

This invention relates to increasing the contrast and resolution of low specular density (below 0.3) film which is otherwise unusable, so that such film is usable.

2. Description of the Prior Art

At present photographic viewers, enlargers, copiers, printers and the like use diffuse or specular transmitted light for viewing, copying and printing. Negatives of normal densities above 0.3 are usable with these devices using diffuse or specular transmitted light. Normally, negatives with densities 0.3 or less are discarded as having little or no information because the contrast level is so low that the image cannot be seen or is barely discernible and unprintable with transmitted light.

In the thin negative case (0.3 density or less) it would be necessary to take the picture over again in order to obtain a usable image. Where the subject is gone or changed, the image is lost forever. Low density films are the result of human errors and insufficient light available to stop motion or record the scene with the available ASA film. Thus, there is a need for a means of recovering information recorded in low density film and to permit low light photography without utilizing the complex, low resolution expensive devices, such as the electro-optical image intensifiers, and microchannel plate amplifiers. Although it is known that silver grains in the film scatter light to an appreciable extent, this phenomenon had not been utilized to increase the resolution and contrast of low density film.

SUMMARY OF THE INVENTION

This invention provides a method and means to increase the contrast and resolution of low density film to permit viewing, printing or copying of images undiscernible by present photographic viewers, printers or enlargers. If desired, the means can also maintain the capability to observe normal density film.

The foregoing is accomplished by illuminating a film having a specular density of 0.3 or less with a projected beam so that the silver grains scatter the light and viewing against a light absorbing or flat black background.

The method of this invention may be used in a light table which may also have a provision for viewing normal density film. It may be used in a printer or an enlarger.

BRIEF DESCRIPTION OF THE DRAWINGS

In the accompanying drawings:

FIG. 1 is a diagrammatic side sectional elevation view showing a light table apparatus for low density and conventional film readout.

FIG. 2 is a diagrammatic view of the apparatus in FIG. 1 showing its use for viewing low density film.

FIG. 3 is another diagrammatic, side elevational view showing another embodiment of an interchangeable scattered and conventional light table for film readout.

FIG. 4 is a schematic view of a vertical copy camera-enlarger for copying and enlarging with scattered light.

DETAILED DESCRIPTION OF THE PREFERRED EMBODIMENTS

This invention utilizes film readout scattered light from the developed silver grains in the film to increase contrast and resolution as compared to diffused transmitted light as is now conventionally used. We have discovered that, if low density film (or a low density area of a film) is viewed or printed by light scattered from the developed silver grains, increased contrast and resolution are obtained. This enhanced visualization of the silver grains occurs in the same manner that dust and smoke particles in a darkened room become visible when illuminated by a projector beam. Specifically, the method of readout or print-out by scattered light is highly useful in film or those areas of the film where the maximum local specular density is about 0.3 or less. Such film would be otherwise unusable. Specular density film is the measurement of density excluding light scattered by silver grains. The definition of film density and its relationship to exposure is well known in the photographic art. See, for example, MEES and JAMES, *THE THEORY OF THE PHOTOGRAPHIC PROCESS*, Chapter 4, 3rd Ed., The MacMillan Co., New York (1966).

Since readout or print-out by scatter enhances the low density film which corresponds to low illumination in the original scene, it in effect serves to increase the speed of the film thus permitting low light photography with normal daylight cameras and films. Also, since scattered light permits readout of the low density areas, it obviously increases the total information available. These effective increases in film speed and in information capacity which result in readout and print-out by scattered light constitute significant improvements in the art.

For consideration of the determination that scatter readout is more effective at densities of 0.3 or less, consider the following analysis of readout by scatter:

Contrast Obtained by Scatter

If we generalize the concept of gamma to refer to the slope of any point on a H–D (density vs. log exposure) curve, and denote this generalized gamma by $g$, we may write:

$$g = \frac{dD}{d \log E} = \frac{d \log \left(\frac{1}{T}\right)}{d \log E} = -\left(\frac{\frac{dT}{T}}{\frac{dE}{E}}\right) \quad (1)$$

where D is the density, E the exposure, and T the transmission. Equation (1) indicates that $g$ is the contrast amplification afforded by the film over that of the original scene (since $dT/T$ represents film contrast between two areas of slightly different film transmission and $dE/E$ represents the correspoding contrast in the original scene). A generalized gamma may analogously be defined for the case of viewing by scattered light as follows:

$$g_{reflect} = g_r = \left(\frac{\frac{dR}{R}}{\frac{dE}{E}}\right)$$

where $R$ is the scatter coefficient. To express $R$ in terms of $T$, we first define $T$ more precisely as the "specular transmission"; that is, $T$ represents the fraction of incident light traversing the film that is undeviated. Representing the absorption coefficient by $A$, it follows that the incident light must be accounted for completely between specular transmission, absorption and scatter:

$$A + T + R = 1 \tag{3}$$

For low emulsion densities, where there is minimal "overlap" between silver grains, it is reasonable approximation to assume that $A$ is proportional to $R^*$ so that (3) may be written:

*Unless there is scatterless absorption in the base. Subtracting out such absorption however leads to no essential error in the derived results, this absorption simply being tantamount to having used a weaker light source.

$$kR = 1 - T \tag{4}$$

where $k$ is a constant for the lower density areas of a given picture. Substituting for $R$ in (2) by use of (4) results in $$g_r = \left( \frac{\frac{dT}{1-t}}{\frac{dE}{E}} \right) \tag{5}$$

But, by definition $$10^D = \left( \frac{1}{T} \right) \tag{6}$$

Where, in keeping with our definition of T as the specular transmission, D is now the specular density. Sutstituting from (6) for T in (5) and comparing to the first equality in (1) leads to $$\left( \frac{g_r}{g} \right) = \frac{-1}{10^D - 1} \tag{7}$$

Equation (7), valid for low densities (below about 0.3), expresses by the quantity $(g_r/g)$ the ratio between the contrast achieved by scatter viewing and that achieved by conventional light table readout.

The break even point is seen to occur at a specular density of $D = 0.3$ where the ratio $(g_r/g)$ has an absolute value of unity. For densities below 0.3 readout by scatter will yield greater contrast than readout by light table. It should be noted that, in accordance with the derivation of (5), (7), the specular density D is exclusive of any contribution that may arise due to scatterless absorption in the base. For D less than about 0.2 equation (7) can, to an adequate approximation, be simplified to $$\frac{g_r}{g} = -\frac{.4}{D} \tag{8}$$

Resolution Obtained by Scatter

At $D = 0.3$ half the light is being intercepted by silver grains so that an observer viewing by scatter sees an average spacing between grains which is about equal to the average spacing between holes seen by an observer viewing the film against a light table. Also at $D = 0.3$ we have from equation (7) that $|g_r| = |g|$; i.e., small density differences present equal contrasts whether viewed by scatter or in the conventional manner using a light table. Because of the equal spacings and equal H–D slopes, $D = 0.3$ represents the point at which resolution of low contrast picture structures are substantially equal, whether viewed by scatter or in the conventional way. (A precisely equal average spacing between grains and between holes is actually not a critical requirement, since at $D = .3$ both the grains and the holes are sufficiently densely packed to afford almost maximum possible resolution, provided adequate contrast exists.)

For a density of say $D = 0.05$ about one eighth the incident light is being intercepted by the silver grains. If we think of the grains as being confined to a single plane, it follows that their average distance apart at $D = 0.05$ must be twice as great as at $D = 0.3$ where half the light is being intercepted. This assumes that the grain sizes are the same for both densities, so that their "area packing" must be in a ratio of ½ to ⅛, or four to one, and their linear packing is thus in a ratio of two to one. This two to one ratio of average spacing implies that, for equal contrasts, the resolution at densities near $D = 0.05$ is only down to one-half that at densities near $D = 0.3$. These considerations may readily be generalized so that a formula relating resolution at low densities obtained by scatter readout to resolution at $D = 0.3$, provided both densities present the same contrast, is obtained:

$$\left[ \begin{array}{c} \text{RESOLUTION DEGRADATION FACTOR} \\ \text{OF DENSITY D WITH RESPECT TO} \\ \text{DENSITY .3} \end{array} \right] = \sqrt{5D} \tag{9}$$

Equation (9) becomes reasonably accurate only for values of D below about 0.2. In the equation D represents the higher of the two low densities forming the resolution pattern image. If we put $D = 0.05$, as in the previous example, the expression is seen to give a resolution degradation factor of 2, in agreement with the value arrived at in that example.

The resolution obtainable by light table readout for an image varying between a maximum density of 0.3 and a minimum density near zero is not much below the maximum high contrast resolution obtainable at optimum density. The departure from the absolute maximum will depend upon the type of film, but the resolution is, at worst, down to about two thirds of maximum.

If we use this knowledge, along with the fact that in a low density picture the local scatter coefficient is proportional to the local density, it is possible to rewrite equation (9) as follows:

$$\left[ \frac{\text{RESOLUTION BY SCATTER FOR MAX. DENS. D}}{\text{MAXIMUM POSSIBLE RESOLUTION OF FILM}} \right] = 1.5 \sqrt{D} \tag{10}$$

where the minimum density can be no more than about half the maximum D.

If, for example, the maximum density is $D = 0.1$ (and the miminum density not more than 0.05) this expression shows the resolution by scatter to be almost one half the maximum possible resolution. As examination of resolution curves for various films indicates that such a density pattern would, if viewed against a light table, result in extreme resolution degradation, e.g. reduces to one tenth of maximum.*

*This typical value of 1/10 may be found in examining results for various films as presented, for example, in a paper by Kardas on film information capacities, "Photo. Eng.", 1955, Vol. 6 p 189.

Equation (10) is written as independent of the ratio of maximum to minimum densities, provided this ratio is not less than 2:1. The reason this can be done is that resolution at a "contrast ratio" of 2:1 is not much less than the resolution at maximum contrast ratio for the same maximum density D. (A ratio of maximum to minimum densities of 2:1 corresponds to a contrast ratio of 2:1 when viewing by scatter since, for low densities, the ratio of the respective densities is equal to the ratio of their scatter coefficients.)

FIG. 1 shows an apparatus for utilizing the method of this invention which is also convertible for use as a conventional light table. As shown in FIG. 1, there is a light table box 10 which is shown only in partial section, since it is conventional. As is known, it has conventional linear light table sources 12 which provide direct light to the underside of a fixed ground glass viewing plate 14. This portion of the light table can function only in the conventional mode.

The light table also includes a reflector 16 which may be either a surface of revolution or a parabolic cylinder. A light source 18 is within the reflector and, if the reflector is a surface of revolution, the light source is small or if it is a cylinder, the light source is a line source perpendicular to the drawing. A reflected beam 20 is reflected from the reflector toward a clear support sheet 22. This support sheet 22 is non-diffusing and it is used if necessary to support the film for scatter readout. If unnecessary, e.g. if the film were supported in a roll, it could be removed. A removable plate 24 of ground glass or ground plastic is on top to use the table for conventional viewing. However, for viewing in accordance with the method of this invention in the scatter mode, this ground glass 24 would be removed.

A baffle area 26 provides a light absorbing background for the film to be viewed. It includes baffle panels 28 in the baffle area which are roughened and blackened.

FIG. 2 illustrates the use of the apparatus shown in FIG. 1 to readout film F having adensity of 0.3 or less scatter of the light hitting the silver grains in the film. An opaque shield 30 is positioned over the fixed ground glass 14 to prevent the observer from looking at the light source 18. The beam is directed toward the film F supported on theclear non-diffusing support sheet 22 and silver grains in the film scatter the beam light as indicated by the small arrows S. An observer can view the film by scattered light against the dark background in the baffle area 26. If he desires, he can also view a portion of the film in a conventional manner, since the diffusing plate 24 has only been partially pulled back as shown.

FIG. 3 shows another arrangement of a light table this time with more of the table visible. The light table 32 of FIG. 3 has conventional reels 34 and 35 for holding film in reel form. A stationary diffuser 36 and a slidable glass diffuser 38 may be positioned over a clear support 22 of FIGS. 1 and 2. Beneath the clear glass support is a light absorbing platform 40 and a adjustable light source 42 projects a reflected beam at an angle off the viewing axis so that the image on a low density film may be viewed by the scattered light. The light source 42 is mounted on an adjustable swivel base 43.

FIG. 4 is an illustration of the principles of this invention as applied to a copy camera-enlarger. Again, there is a box 44 containing light sources 46 for projecting reflected beams at an off axis angle and a black absorbing background 48. A pair of film reels 50 and 52 hold film F which has low specular density. A format platen 54 is positioned over the portion of the film to be copied. A camera support 56 supports a copy camera 58 for copying and/or enlarging the portion of the film within the format platen.

It can be seen that applicants' method may be used in various viewing, copying, printing and enlarging situations by utilizing scattered light of a low specular density negative by illuminating the negative with a reflected beam from an off-axis position and viewing against a black light absorbing background.

We claim:

1. Apparatus for viewing film, said apparatus comprising:
    a. first means for supporting the film, said first means including a light diffusing portion for viewing normal density film and a non-light diffusing portion for viewing film having a specular density of less than 0.3, said light diffusing portion being movable to cover and uncover said non-light diffusing portion;
    b. second means for producing a beam of light;
    c. third means for mounting the second means so as to direct its beam onto a first side of the film at an angle to an axis perpendicular to the plane of the film; and
    d. a light absorbing background spaced from the film on the first side thereof.

2. Apparatus as recited in claim 1 wherein said second means comprises a light source and a reflector.

3. Apparatus as recited in claim 1 wherein said third means is mounted in a location offset from the film and not between the film and the light absorbing background.

4. Apparatus for viewing, copying, or printing a silver grained film having a specular density of less than 0.3, said apparatus comprising:
    a. first means for supporting the film;
    b. a light absorbing background spaced from the film on a first side thereof;
    c. second means for producing a beam of light;
    d. third means for mounting the second means spaced from the film on the frist side thereof in a location offset from the film and not between the film and the light absorbing background, whereby the beam of light is directed onto and passes through the film at an angle to an axis perpendicular to the plane of the film and the silver grains scatter the light to increase contrast of the film and facilitate viewing thereof from the other side of the film against said light absorbing background.

5. Apparatus as in claim 4 wherein the apparatus is used for copying or printing and further comprising a copying camera and a support therefor on the side of the film opposite the first side thereof.

6. Apparatus as recited in claim 4 wherein said second means comprises a light source and a reflector.

7. Apparatus as in claim 4 wherein said first means comprises a light diffusing portion for viewing normal density film and a non-light diffusing portion for viewing film having a specular density of less than 0.3.

8. Apparatus as in claim 7 wherein the light diffusing portion of the first means is movable to cover and uncover the non-light diffusing portion.

9. A method of increasing contrast and resolution of images projected from low specular density images on photographic film including developed silver grains, said method comprising the steps of:
   a. positioning a silver grained film having an image density of less than 0.3 in a position to be viewed, copied, or printed;
   b. providing a light absorbing background spaced from a first side of the film; and
   c. illuminating the film with a projected beam of light from a suitable source of illumination spaced from the film on the first side thereof in a location offset from the film and not between the film and the light absorbing background so that the beam of light is directed onto and passes through the film at an angle to an axis perpendicular to the plane of the film, whereby the silver grains scatter the light to increase contrast and resolution of images projected from the film and facilitate viewing of the film from the other side of the film against said light absorbing background.

10. A method as recited in claim 9 and further comprising the step of adjusting the angle of direction of the illumination.

* * * * *